United States Patent

[11] 3,579,966

| [72] | Inventor | Stanley F. Allina<br>Ladue, Mo. |
|---|---|---|
| [21] | Appl. No. | 765,080 |
| [22] | Filed | Oct. 4, 1968 |
| [45] | Patented | May 25, 1971 |
| [73] | Assignee | The Perfection Manufacturing Company<br>St. Louis, Mo. |

[54] GRASS CATCHER ASSEMBLY
8 Claims, 4 Drawing Figs.

[52] U.S. Cl. .................................................. 56/202
[51] Int. Cl. ............................................. A01d 35/22
[50] Field of Search .......................................... 56/202

[56] References Cited
UNITED STATES PATENTS

| 2,494,062 | 1/1950 | Sherrow | 56/202 |
| 2,918,694 | 12/1959 | Tarrant | 56/202X |
| RE24,955 | 3/1961 | Campbell | 56/202 |
| 3,133,396 | 5/1964 | Leader | 56/202 |
| 3,230,696 | 1/1966 | Liljenberg | 56/202 |
| 3,374,612 | 3/1968 | Leader II | 56/202 |

*Primary Examiner*—Louis G. Mancene
*Assistant Examiner*—J. A. Oliff
*Attorney*—Cohn and Powell ABSTRACT: The grass catcher assembly includes a catcher bag having an open end and a closed end, the closed end being supported from the lawn mower by a cantilever support arm. The mouth of the catcher bag includes a split hoop wire frame stitched within the hem, the split frame includes opposed hook portions at each end. An adapter plate attached to the lawn mower housing above the discharge orifice includes engagement means in the form of a pair of spaced lugs. The split wire frame is sprung into interlocking engagement with the spaced lugs to hold the open end of the bag in overlapping relation with the discharge orifice.

PATENTED MAY 25 1971 3,579,966
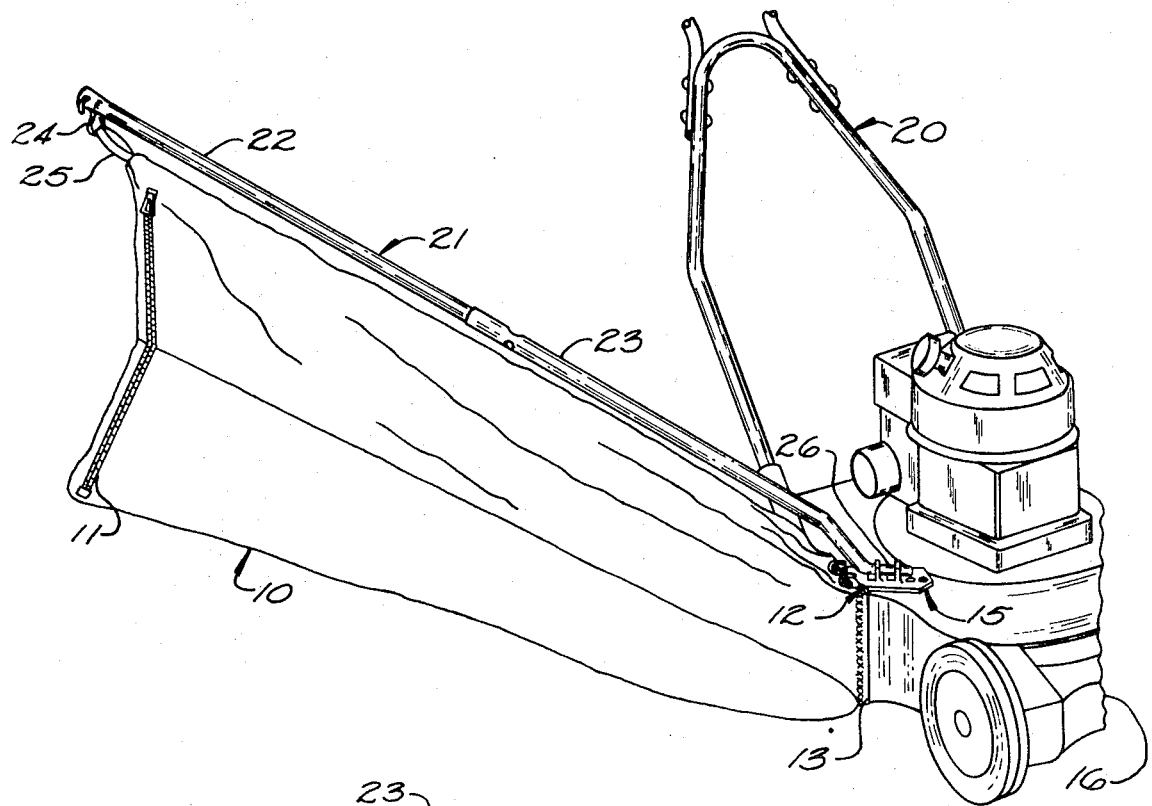
Fig 1
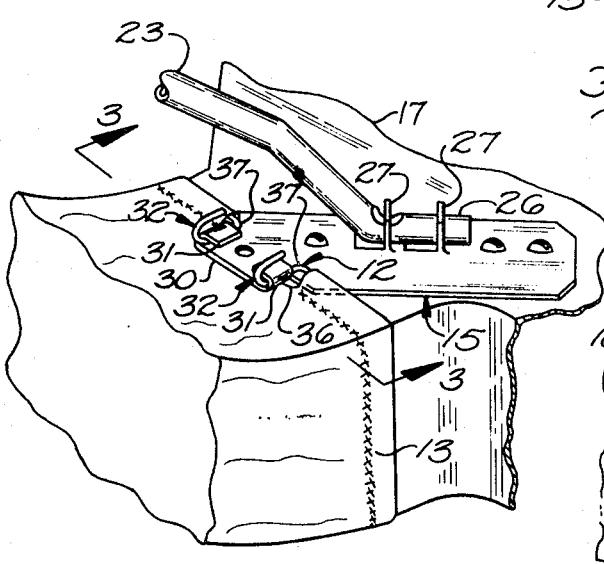
Fig 2
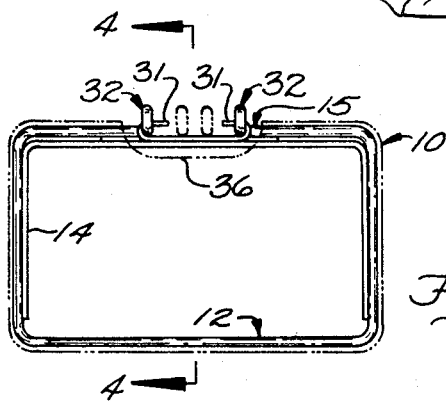
Fig 3
Fig 4
INVENTOR
STANLEY F. ALLINA
By Cohn and Powell
ATTORNEYS

GRASS CATCHER ASSEMBLY

BACKGROUND OF THE INVENTION

This invention relates generally to a grass catcher bag assembly, and more particularly to an assembly for attachment of a bag to the grass discharge chute of a rotary lawn mower housing.

There are several grass catcher bag attachments commercially available. Such heretofore conventional assemblies typically include a discharge orifice framing element which is fitted to the lawn mower housing around the grass discharge orifice. The framing element is usually adjustable to accommodate some variation in the size of the bat, and the bag is provided with a drawstring in order that it may be tightened around the framing element. Obviously, when the bag is being emptied, the mouth must be held open. This construction has an inherent disadvantage in that holding the bag open while emptying is a very awkward operation for a single individual. Other grass catcher assemblies which are currently in use include those having a rigid, or semirigid catcher. Still others are those in which the orifice frame is part of a larger framework stiffening the bag. These catchers are, in general, cumbersome and bear little relation to the structure of the present assembly.

SUMMARY OF THE INVENTION

This assembly is reduced to extreme simplicity by providing a resilient wire frame around the mouth of the bag. The frame is so formed as to permit the bag to be clipped to a lawn mower housing with hitherto unknown facility. The bag may be removed and emptied with ease by a single operator.

An adapter plate is attached to the housing and, in effect, becomes a permanent part thereof. The grass catcher bag assembly includes a catcher bag having a framed open end and a closed end. Cantilever support means supports the closed end of the catcher bag. A split hoop frame frames the open end of the bag, the split frame including opposed ends. The adapter plate, adapted to be attached to the lawn mower housing above the discharge orifice, includes engagement means engaging the opposed ends of the split frame to hold the open end of the bag in overlapping relation with the discharge orifice. The opposed ends of the split frame include hook portions interlockingly engaging the adapter plate engagement means.

The frame is resilient in its plane and forms an open, substantially rectangular configuration. The hook portions at the opposed ends include digitally manipulative means whereby the ends may be urged into locking engagement with the adapter plate engagement means against the resilience of the frame.

The engagement means of the adapter plate includes hook means interlockingly engageable with the frame hook portions, the adapter plate hook means consisting of a pair of spaced lugs operatively embracing associated frame hook portions in interlocking engagement.

The frame hook portions include a pair of selectively spaced legs transversely disposed in the plane of the frame, and the engagement means of the adapter plate includes a pair of spaced lugs substantially parallel with said legs, each lug operatively embracing an associated leg in interlocking engagement upon digital urging of the frame hook portions relative to each other. Each lug embracingly engages its associated leg substantially between the plane of the frame and a stop means provided at the end of each leg.

The opposed ends of the split frame are bent transversely of the plane of the frame into reentrant, substantially U-shaped hook portions having upper and lower legs. The catcher bag includes a hem at the open end substantially enclosing the frame, and the hem includes an aperture exposing the substantially U-shaped hook portions.

The adapter plate includes a projecting portion carrying the substantially U-shaped lugs. The hem aperture operatively receives the projecting portion to permit the split frame to be positioned rearwardly of the lugs, and the substantially U-shaped hook portions to be disposed adjacent to associated spaced lugs.

The upper legs of the substantially U-shaped hook portions provide digitally manipulative members facilitating interlocking embracing engagement of the substantially U-shaped hook portions and the associated lugs.

BRIEF DESCRIPTION OF THE DRAWING

FIG. 1 is a fragmentary perspective view of a rotary lawn mower illustrating the catcher bag in its installed position:

FIG. 2 is an enlarged, fragmentary detail of the adapter plate and the framed mouth of the catcher bag;

FIG. 3 is a cross-sectional view as taken on line 3—3 of FIG. 2 and illustrates the relative dispositions of the split wire frame and the discharge orifice. The catcher bag is shown in phantom outline for clarity, and FIG. 4 is a sectional view as taken on line 4—4 of FIG. 3.

DESCRIPTION OF THE PREFERRED EMBODIMENT

Referring now by characters of reference to the drawing, and first to FIG. 1, it will be understood that the grass catcher assembly includes a grass catcher bag 10, which is provided with a zip fastener 11 at the closed end. A split hoop frame 12 is stitched within a substantially peripheral hem 13 at the open mouth end of the bag, and provides a means of attaching the open end of the bag 10 in overlapping relation to the grass discharge orifice 14.

The wire frame 12 is attached to an adapter plate generally shown by numeral 15. The adapter plate is attached as by screws 16 to the housing 17 of the rotary lawn mower, the mower being generally shown by numeral 20.

A single cantilever support arm 21 including outer and inner telescoping portions 22 and 23 respectively, support the catcher bag 10 at its closed end by means of an S-wire fastener 24 attached to a loop 25 provided at the upper, outer corner of the bag 10.

The cantilever support arm 21 is attached at its inner end 26 to the adapter plate 15. To effectuate this attachment, the cantilever support arm 21 is flattened to a semicircular configuration and the adapter plate 15 is provided with a pair of spaced connector tabs 27. Each of the tabs 27 has semicircular apertures receiving the flattened end 26 of the cantilever support arm 21. The connector tabs 27 provide a simple attachment for the support arm 21 in that the semicircular configuration of the apertures in the connector tabs 27 permits the flattened portion of the arm 21 to be laid flat against the adapter plate 15. The flattened end 26 of the cantilever arm 21 is a snug fit into the apertures of the tabs 27. The spaced relation of the tabs 27 provides a force-couple action precluding movement of the support arm 21 transverse to the longitudinal axis of the flat end. The semicircular configuration of the flattened end precludes rotation of the flattened end about its own axis.

The adapter plate 15 includes at its forward end, a projecting portion 30. The projecting portion 30 includes a pair of reversely formed lugs providing hook means 31.

The split hoop frame 12 is preferably formed from wire rod and is bent substantially into an open, rectangular configuration including opposed substantially U-shaped ends constituting hook portions 32. The discontinuous nature of the wire frame 12 provides it with considerable resilience relative to its plane. By this it is meant that the substantially U-shaped hook portions 32 can be drawn together with facility by means of a finger and thumb, the digital action thereby tensioning the frame 12 against the spring action created by its inherent resilience.

It will be understood that the substantially U-shaped hook portions 32 of the frame 12 are bent transversely to the plane of the frame into their reentrant substantially U-shaped. Each substantially U-shaped hook portion 32 includes a lower leg 33, an upper leg 34 and a bight 35. In the installed position, each lug 31 on the adapter plate 15 embracingly engages the lower leg 33 of an associated hook portion 32 of the frame 12 between the bight 35 and the bight 37 formed at the junction of projecting U-shaped hook portions 32 with the plane portion of the frame 12.

It is thought that the functional advantages of this catcher bag assembly have become fully apparent from the foregoing description of parts. However, for completeness of disclosure, the installation of the assembly will be briefly described.

The adapter plate 15 which, in effect, becomes a permanent part of the lawn mower housing 16 is screwed into position above the grass discharge orifice 14. In this position, the projecting portion 30 of the adapter plate 15 is substantially in line with the edge of the discharge orifice 14 as may be clearly seen in FIG. 4. The split wire frame 12 is substantially enclosed within the hem 13 at the mouth of the catcher bag 10. The hook portions 32 provided at opposing ends of the split frame 12 exposed by virtue of an aperture 36 which is provided in the upper portion of the hem area. The mouth of the catcher bag 10 can be slipped into overlapping relation with the discharge orifice 14, substantially in register therewith by the simple expedient of selectively squeezing together the hook portions 32 between the forefinger and thumb and then slipping the mouth of the bag 10 into overlapping relation with the discharge orifice 14 as is clearly shown in FIG. 4.

It will be understood of course that the split wire frame 12 is slightly larger than the periphery of the discharge orifice 14 and that the hem 13, to some extent, acts as a pad, sealing the mouth of the bag 10. When the frame 10 is positioned rearwardly of the lugs 31, as described, the substantially U-shaped hook portions 32 are released and become embraceably engaged by the lugs 31, which, of course, constitute engagement means on the adapter plate 15.

Each lug 31 embracingly engages its associated leg 33 substantially between the plane of the frame 12 and the stop means provided by the bight 35. The relatively wide lugs 31 thereby hold the hook portions 32 substantially along the full length of the lugs 31, ensuring a tight grip.

Obviously, removal of the bag 10 is accomplished very simply by digital manipulation of the hook portions 32. The upper legs 34 are grasped between forefinger and thumb, and squeezed together sufficiently to become free of the lugs 31, as clearly shown in FIG. 3. A slight upward and outward movement completely frees the mouth end of the bag 10 from the grass discharge orifice 14.

The bottom end of the telescopic support arm 21 can now be positioned within the apertures in the tabs 27. It is a simple matter to attach the upper outer end of the bag 10 by means of the loop 25 to the S-hook 24. The zipper 11 is provided at the closed end of bag 10 for convenience in emptying from this end if desired. The cantilevering of the bag 10 is an advantage in that the weight of the bag 10 acts to keep the lower position of the mouth of the bag 10 firmly in place relative to the discharge orifice 14.

I claim:

1. A grass catcher bag assembly for attachment to the discharge orifice of a lawn mower housing comprising:
   a. a catcher bag including an open end and a closed end,
   b. a split hoop frame, framing the open end of the bag and including opposed ends selectively movable relative to each other,
   c. cantilever support means supporting the closed end of the catcher bag, and
   d. an adapter plate adapted to be attached to the lawn mower housing above the discharge orifice and including engagement means engaging the opposed ends of the split frame to hold the open end of the bag in register with the discharge orifice.

2. An assembly as defined in claim 1, in which:
   e. the opposed ends of the frame include hook means, interlockingly engaging the adapter plate engagement means above the discharge orifice.

3. An assembly as defined in claim 1, in which:
   e. the split frame is resilient and forms an open, substantially rectangular configuration, and
   f. the opposed ends of the split frame include digitally operable projecting means, whereby said ends may be digitally actuated into locking engagement with the adapter plate engagement means.

4. An assembly as defined in claim 1, in which:
   e. the split frame is resilient and has a substantially rectangular configuration,
   f. the opposing ends of the frame are formed into hook means including a pair of selectively spaced legs transversly disposed to the plane of the frame,
   g. the engagement means of the adapter plate includes a pair of spaced lugs substantially parallel with the legs, each lug operatively embracing an associated leg in interlocking engagement upon digital actuation of the hook means of the frame relative to each other,
   h. each leg includes stop means disposed in spaced relation from the plane of the frame, and
   i. each lug embracingly engages its associated leg substantially between the plane of the frame and the stop means.

5. An assembly as defined in claim 1, in which:
   e. the split frame has an open rectangular configuration and includes hook means at each opposing end,
   f. the engagement means of the adapter plate includes spaced hook means interlockingly engageable with the frame hook means, and
   g. the split frame is resilient and the hook means of the split frame are digitally engageable whereby to be manually actuated into locking engagement with the spaced hook means on the adapter plate in cooperation with the resilience of the frame.

6. An assembly as defined in claim 1, in which:
   e. the opposed ends of the split frame include hook means providing a pair of selectively spaced legs, and
   f. the engagement means of the adapter plate includes a pair of spaced lugs operatively embracing associated legs in interlocking engagement, the minimum clear spacing between the lugs being less than the maximum spacing across the engaged portion of the legs in the interlocked condition.

7. An assembly as defined in claim 1, in which:
   e. the adapter plate includes a projecting portion carrying the engagement means,
   f. the catcher bag includes a hem at the open end substantially enclosing the frame within the hem, the hem including an aperture exposing the opposed ends of the frame, and
   g. the aperture operatively receives the projecting portion of the adapter plate to permit the frame to be positioned rearwardly of the adapter plate engagement means whereby to facilitate secure engagement of the opposed ends of the frame with the engagement means.

8. A grass catcher bag assembly for attachment to the discharge orifice of a lawn mower housing comprising:
   a. a catcher bag including an open end and a closed end,
   b. a split hoop frame, framing the open end of the bag and including opposed ends,
   c. cantilever support means supporting the closed end of the catcher bag,
   d. an adapter plate adapted to be attached to the lawn mower housing above the discharge orifice and including engagement means engaging the opposed ends of the split frame to hold the open end of the bag in register with the discharge orifice,
   e. the frame being resilient and formed from wire rod into an open substantially rectangular configuration,
   f. the opposed ends of the frame being bent transversely of the plane of the frame into reentrant substantially U-shaped hook portions having upper and lower legs,
   g. the catcher bag including a hem at the open end substantially enclosing the frame, the hem including an aperture exposing the substantially U-shaped hook portions, h. the adapter plate engagement means including a pair of spaced lugs, operatively embracing the lower legs of the substantially U,shaped hook portions substantially between the bight of the hook portions and the plane of the frame, i. the adapter plate including a projecting portion carrying the lugs, j. the hem aperture operatively receiving the projecting portion to permit the frame to be positioned rearwardly of the lugs, and the substantially U-shaped hook portion to be disposed adjacent to an associated spaced lug, and k. the upper legs of the substantially U-shaped hook portions providing digitally manipulative members facilitating interlocking embracing engagement of the substantially U-shaped hook portions and associated lugs.